United States Patent [19]
Neuhof

[11] Patent Number: 6,095,467
[45] Date of Patent: Aug. 1, 2000

[54] SUPPORT ARM SYSTEM FOR A CONTROL DEVICE

[75] Inventor: Markus Neuhof, Ehringshausen-Niederlemp, Germany

[73] Assignee: Rittal-Werk Rudolf Loh GmbH & Co. KG, Herborn, Germany

[21] Appl. No.: 09/238,253

[22] Filed: Jan. 27, 1999

[30]     Foreign Application Priority Data

Jan. 30, 1998 [DE] Germany ............................ 198 03 570

[51] Int. Cl.[7] .............................. E04G 3/00; F16M 13/00; F16M 1/00; A47F 7/14; A47G 1/16
[52] U.S. Cl. ........................ 248/278.1; 248/634; 248/638; 248/921
[58] Field of Search ................................. 248/610, 278.1, 248/638, 611, 634, 289.11, 917, 921; 403/226, 225, 220, 372

[56]                References Cited

U.S. PATENT DOCUMENTS

| | | | |
|---|---|---|---|
| D. 369,196 | 4/1996 | Münch et al. ........................... | D22/112 |
| 1,606,966 | 1/1926 | Smith-Clarke ........................... | 248/611 |
| 1,912,451 | 6/1933 | Hibbard ................................... | 248/638 |
| 1,968,040 | 7/1934 | Houdek .................................... | 248/611 |
| 2,020,092 | 11/1935 | Allen ........................................ | 248/611 |
| 2,389,562 | 11/1945 | Storch ..................................... | 248/611 |
| 3,287,863 | 11/1966 | Field ....................................... | 403/225 |
| 3,891,191 | 6/1975 | Choules et al. ......................... | 248/610 |
| 4,147,319 | 4/1979 | Tsybulnik et al. ...................... | 248/638 |
| 4,629,154 | 12/1986 | Kataczynski ............................ | 248/610 |
| 4,657,361 | 4/1987 | Eitel et al. .............................. | 248/634 |
| 4,953,821 | 9/1990 | Reuter et al. ........................... | 248/276 |
| 4,997,155 | 3/1991 | Reuter et al. ........................... | 248/278 |
| 4,998,702 | 3/1991 | Reuter et al. ........................... | 248/278 |
| 5,478,044 | 12/1995 | Hyde ....................................... | 248/638 |
| 5,522,118 | 6/1996 | Neuhof et al. ............................. | 16/386 |
| 5,533,763 | 7/1996 | Neuhof .................................... | 285/127 |
| 5,662,397 | 9/1997 | Neuhof et al. ....................... | 312/223.1 |
| 5,884,893 | 3/1999 | Seki et al. .............................. | 248/638 |
| 5,897,276 | 4/1999 | Hartel ..................................... | 411/174 |

*Primary Examiner*—Ramon O. Ramirez
*Assistant Examiner*—Jon A Szumny
*Attorney, Agent, or Firm*—Pauley Petersen Kinne & Fejer

[57]                ABSTRACT

A support arm system with a wall connector element, horizontal and vertical support arms, angle brackets and joint elements, and a free end on which a control device is attached with an articulated joint, so that the free end is rotatably limited and can be fixed in place. Vibrations in the wall on which the support arm system is fastened can be isolated from the control device in a simple manner because a housing, which has two housing elements, is connected with the articulated joint element of the articulated joint facing the control device, and because a connecting element is housed, elastically supported horizontally and vertically by cushioning elements, in the housing, and the connecting element is connected with the control device.

15 Claims, 4 Drawing Sheets

SUPPORT ARM SYSTEM FOR A CONTROL DEVICE

BACKGROUND OF THE INVENTION

This invention relates to a support arm system with a wall connector element, horizontal and vertical support arms, angle brackets, and joint elements, on a free end of which a control device is attached by an articulated joint, so that the support arm is rotatably limited and can be fixed in place.

The control device can be attached to a horizontal or vertical wall using such a support system wherein, depending on the assembly of the elements used, the control device, which is attached to the free end of the support arm system can be displaced about a horizontal or vertical pivot axis by using the articulated joint and can be fixed in place in a desired position. Since the elements of the support arm system are mechanically connected or coupled with each other, vibrations in the wall are transferred to the control device.

This is disruptive, particularly with control devices with sensitive electrical installations, because it is thus possible for interruptions or outages of the functions to occur.

SUMMARY OF THE INVENTION

It is one object of this invention to insulate a control system of the type mentioned above from vibrations of the wall, to which it is attached, without disadvantages to the operating functions of the control device.

This object is attained in accordance with this invention with a housing, which has two housing elements, connected with the articulated joint element of the articulated joint facing the control device. A connecting element is housed, elastically supported horizontally and vertically by cushioning elements, in the housing, and the connecting element is connected with the control device.

With this design of the support arm system, the connecting element to which the control device is attached, is only supported and coupled via cushioning elements with the assembled housing connected with the articulated joint. Thus, vertical and horizontal vibrations at the end of the support arm system can only reach the control device in a very cushoned manner. But the setting and fixation options of the control device by the articulated joint remain unchanged.

In accordance with one embodiment, the housing elements and the connecting element are designed in a ring shape with centered openings, and thus it is possible to conduct control lines from the wall to the control system in a protected manner. This is particularly important when the wall is a part of a machine which is to be controlled.

So that the housing forms a receptacle for the connecting element in a simple manner, in accordance with one embodiment, the one housing element is designed in a cup-shaped manner, and the other housing element is designed in a disk-shaped manner, and both housing elements are connected with each other with screws.

In accordance with one embodiment of this invention, the screw connections are designed in such a way that the cup-shaped housing element is bolted together with the facing articulated joint element via through-bores of the connecting element. The control device is bolted to the connecting element placed in the assembled housing through the central opening of the disk-shaped housing element.

In accordance with another embodiment of this invention, the resilient support of the connecting element in the assembled housing is achieved because the connecting element has at least three flange elements on its circumference, onto which pocket-shaped cushioning elements are pushed. The cushioning elements are supported on the insides of the housing elements facing each other, as well as on the interior wall of the cup-shaped housing element.

In accordance with a further embodiment of this invention, the transition between the support arm system and the control device is designed in such a way that the connecting element partially projects out of the centered opening of the disk-shaped housing element. The diameter of the centered opening of the housing element is larger than the exterior dimensions of the part of the connecting element projecting out of the housing, and thus contact is completely prevented between the housing element and the control device.

The manufacture of the screw connections is simplified, while maintaining the desired lack of contact, because the cup-shaped housing element has bores and the facing articulated element of the articulated joint has threaded receptacles for screws inserted through expanded through-bores of the connecting element. The connecting element has threaded receptacles for the screws, which connect the control device with the connecting element.

It is possible to retrofit existing support arm systems with the system of this invention, for preventing contact between the housing and the connecting element. The cost outlay can be reduced because the articulated joint element facing the control device is itself designed and used as the cup-shaped housing element.

This invention will be explained in greater detail by means of an exemplary embodiment represented in the drawings.

DESCRIPTION OF PREFERRED EMBODIMENTS

Figure 1:
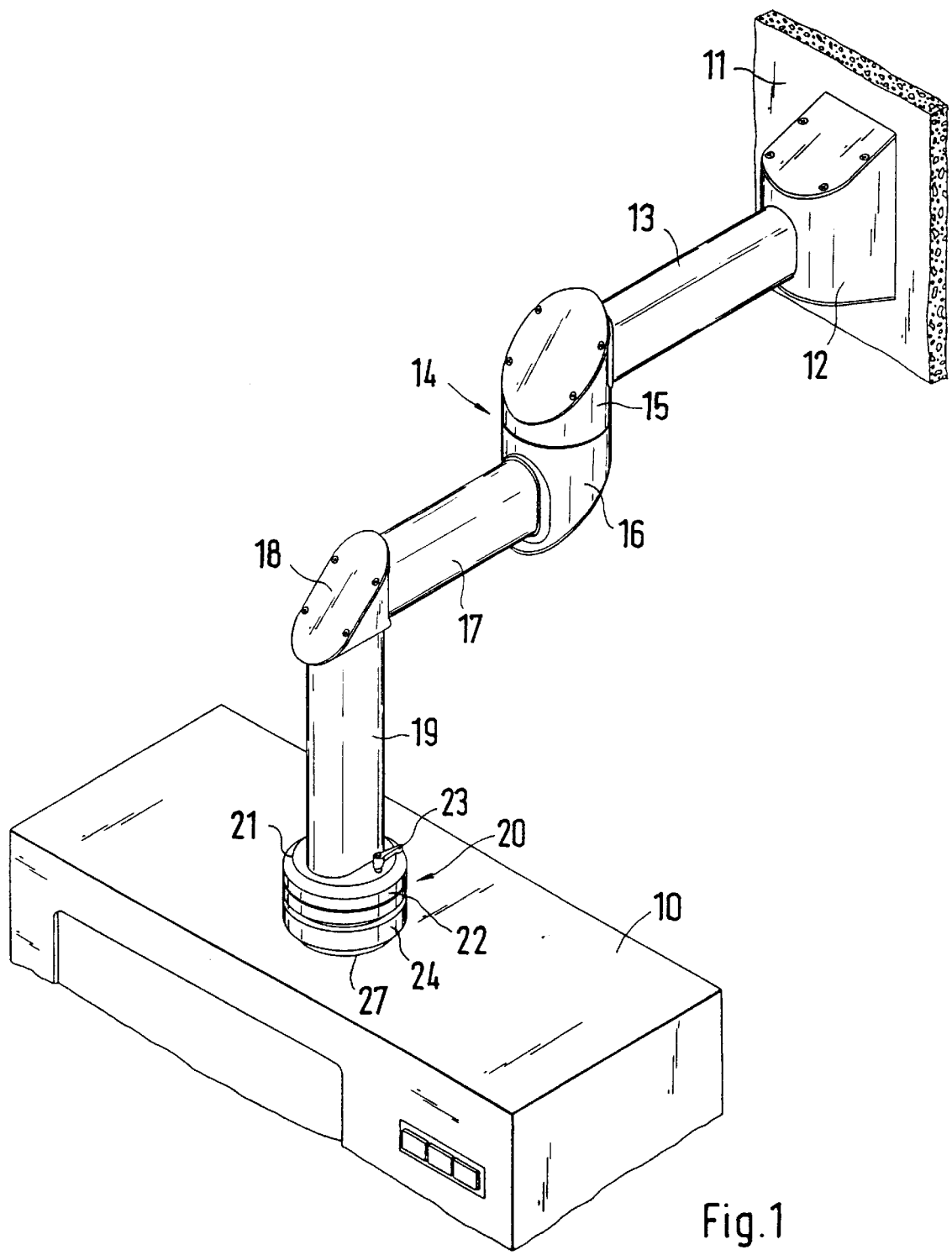
FIG. 1 is a perspective view of a control device fastened to a wall with a support arm system.

The support arm system represented in FIG. 1 comprises a wall connector element 12, by means of which a horizontal support arm 13 is fastened on the wall 11. An articulated joint comprising articulated joint elements 15 and 16 connects the support arms 13 and 17, so that they can pivot about a vertical axis of rotation with respect to each other. A vertical support arm 19 is connected with the horizontal support arm 17 by means of an angle element 18. The lower end of the support arm 19 supports an articulated joint 20, comprising the articulated joint elements 21 and 22. The articulated joint 20 allows a limited pivoting of the control device 10 on the support arm system. The articulated joint 20 can be fixed in place by means of an arresting device 23, so that the control device 10 maintains a previously set pivot position.

Additional elements 24, 27 are positioned between the articulated joint 20 and the control device 10, which are used for preventing contact between the control device 10 and the support arm system, which will be explained later.

Figure 2:
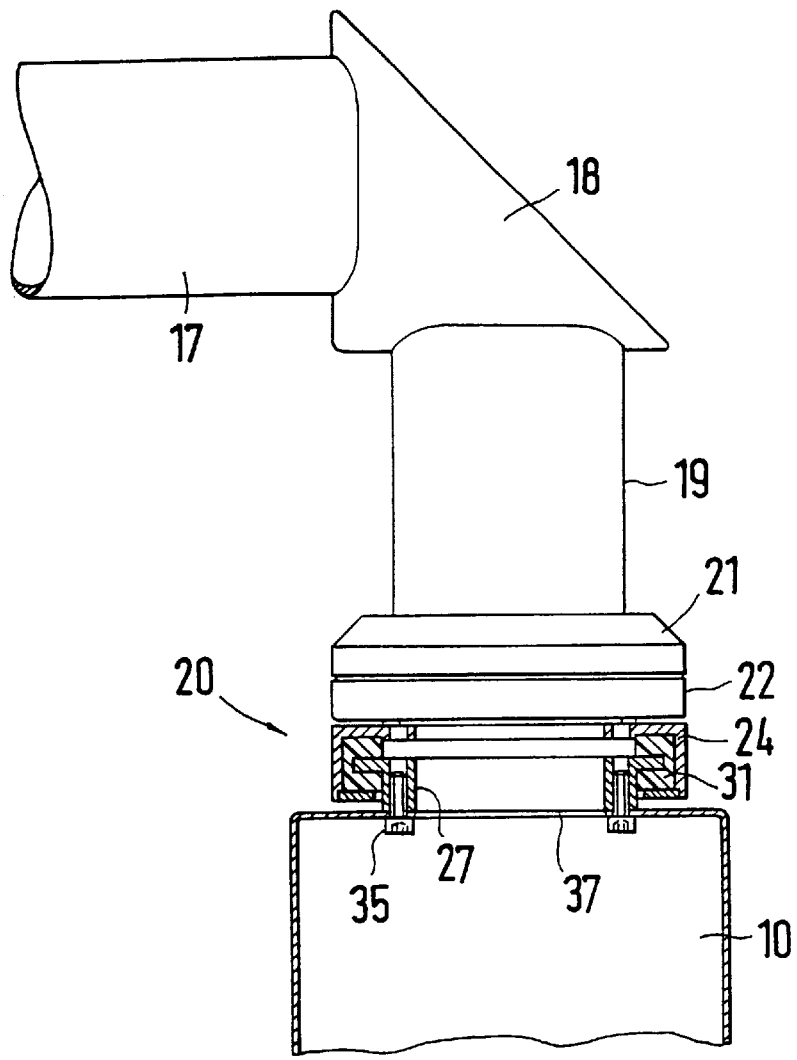
FIG. 2 is a partial sectional view of a portion of the support arm system shown in FIG. 1, wherein a section shows the elements for preventing contact between the control device and the articulated joint.
Figure 4:
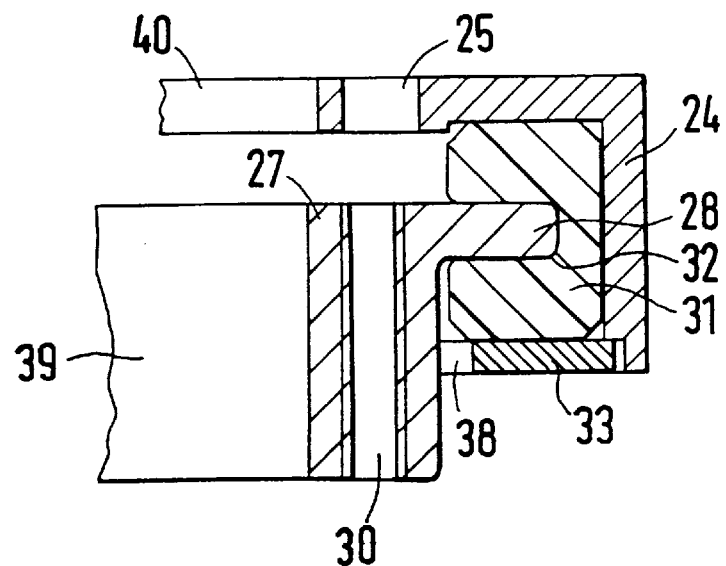
FIG. 4 is an enlarged partial sectional view of the elements for preventing contact in the mounted position.
Figure 3:
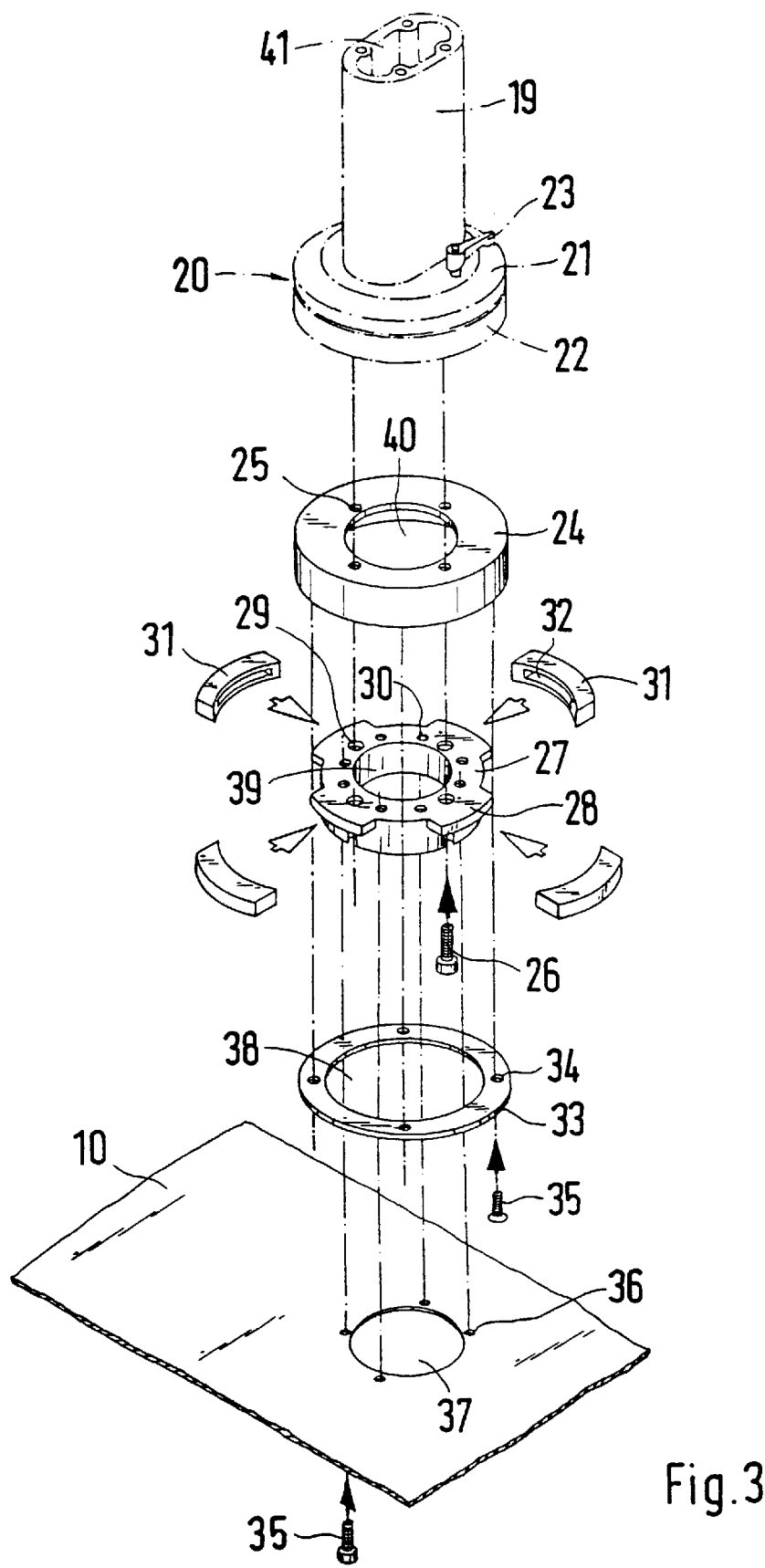
FIG. 3 is an exploded perspective view of the elements for preventing contact.

As shown in FIGS. 2 to 4, elements comprise a cup-shaped and ring-shaped housing element 24 and a disk-shaped and ring-shaped housing element 33, which together form a housing for a connecting element 27, which have centered openings 38, 39 and 40, as shown in FIG. 3, so that control lines can be conducted to the control device 10. The control device 10 has an associated insertion opening 37.

Figure 5:
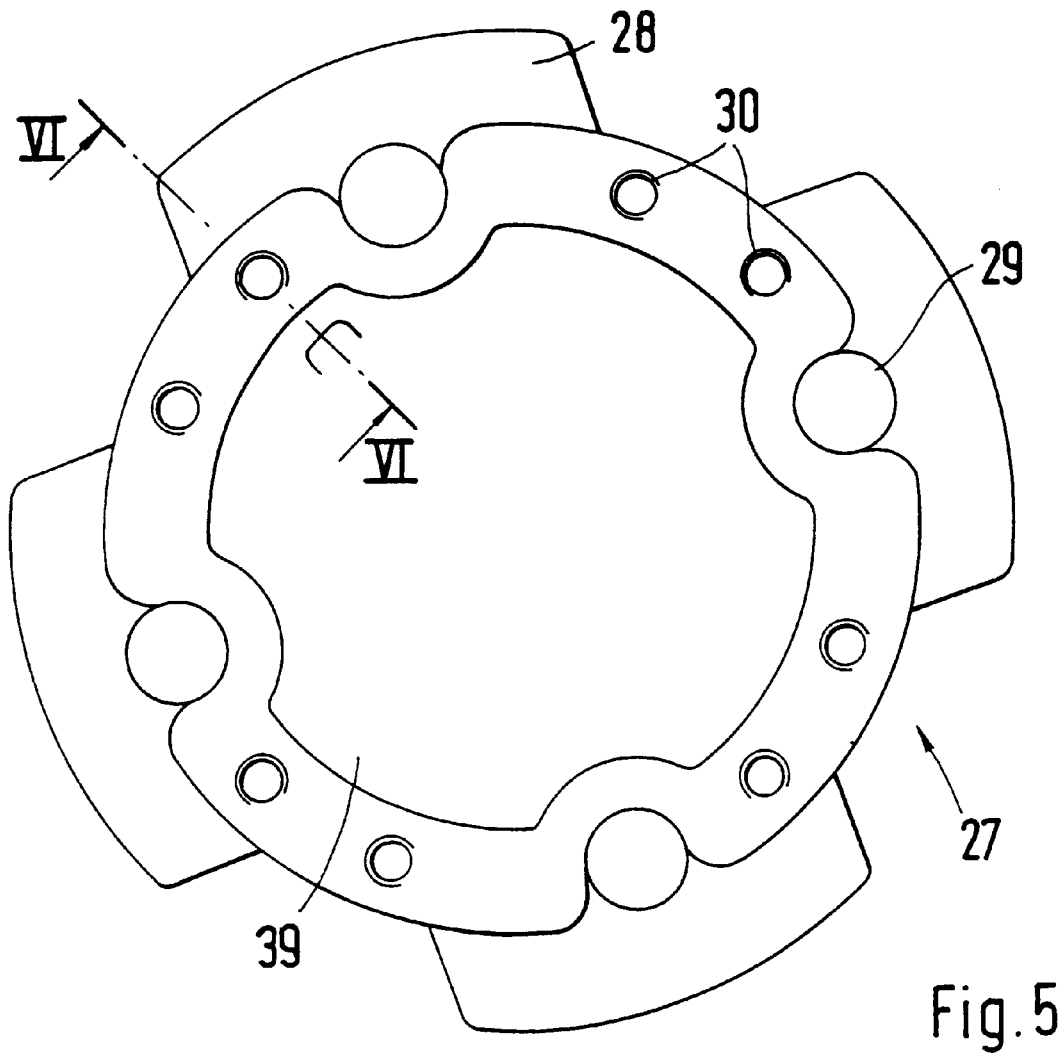
FIG. 5 is an enlarged side view of the connecting element, looking on the side facing the control element.

The cup-shaped housing element 24 has bores 25 for screws 26, which are screwed into associated threaded receptacles in the articulated joint element 22. The screws 26 can be passed through the widened through-bores 29 of the connecting element 27 without contact, as shown in FIG. 5.

The housing for the connecting element 27 is completed by the disk-shaped housing element 33. Both housing elements 24 and 33 are screwed together with screws 35, wherein the housing element 33 has bores 34 and the housing element 24 has correspondingly distributed threaded receptacles.

Figure 6:
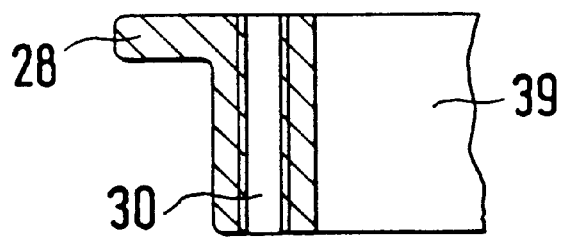
FIG. 6 is a partial sectional view taken along the line VI—VI as shown in FIG. 5.

The control device 10 has bores 36 distributed around the insertion opening 37 for screws 35, which are screwed into continuous threaded receptacles 30 of the connecting element 27, as shown in FIG. 6. With a lower end, the connecting element 27 partially projects out of the assembled housing, wherein the diameter of the opening 38 in the housing element 33 is greater than the exterior dimensions of the part of the connecting element 27 projecting out of the housing, as shown by the sectional view in FIG. 4. It is thus assured that the housing does not contact the connecting element 27.

In the exemplary embodiment, the connecting element 27 has four flanges 28 projecting away from a circumference, onto which pocket-shaped, resilient cushioning elements 31 with corresponding receptacles 32 are pushed, as shown in FIG. 3. In the mounted position, the cushioning elements 31 are supported vertically, i.e. in the direction of the pivot axis of the articulated joint 20, on the facing inner sides of the housing elements 24 and 33. Perpendicular to the pivot axis, the cushioning elements 31 are supported on the inner wall of the housing element 24, as shown in FIG. 4. Cushioning is thus achieved in both directions via the housing and the connecting element 27 housed therein, so that vibrations coming from the support system can reach the connecting element 27 and the connected control device 10 only in a strongly cushioned manner.

The articulated joint element 22 of the articulated joint 20 can be designed in such a way that it also assumes functions of the cup-shaped housing element 24. It is thus possible to reduce the cost outlay for preventing vibrations coming from the support arm system from reaching the control device 10.

What is claimed is:

1. In a support arm system having a wall connector element, horizontal and vertical support arms, angle brackets, and joint elements, and a free end on which a control device is attached by an articulated joint, so that the free end is rotatably limited and can be fixed in place, the improvement comprising:

a housing having two housing elements (24, 33), the housing connected with an articulated joint element (22) of the articulated joint (20) facing the control device (10);

a connecting element (27) housed, elastically supported horizontally and vertically with a plurality of cushioning elements (31), in the housing; and the connecting element (27) connected with the control device (10), the connecting element (27) having at least three flange elements (28) on a circumference of the connecting element (27), a plurality of pocket-shaped cushioning elements (31) pushed onto the flange elements (28), and the cushioning elements (31) supported on insides of the housing elements (24, 33) facing each other and on an interior wall of the cup-shaped housing element (24).

2. In the support arm system in accordance with claim 1, wherein the housing elements (24, 33) and the connecting element (27) have a ring shape with centered openings (38, 39, 40).

3. In the support arm system in accordance with claim 2, wherein one of the housing elements (24) is designed in a cup-shaped manner, and the other of the housing elements (33) is designed in a disk-shaped manner, and both of the housing elements (24, 33) are connected with each other with screws (35).

4. In the support arm system in accordance with claim 3, wherein the cup-shaped housing element (24) is bolted together with the articulated joint element (22) facing the cup-shaped housing element (24) via a plurality of through-bores (29) of the connecting element (27).

5. In the support arm system in accordance with claim 4, wherein the control device (10) is bolted to the connecting element (27) placed in the assembled housing through the centered opening (38) of the housing element (33) which is disk-shaped.

6. In the support arm system in accordance with claim 5, wherein the connecting element (27) partially projects out of the centered opening (38) of the disk-shaped housing element (33), and a diameter of the centered opening (38) of the disk-shaped housing element (33) is larger than exterior dimensions of a part of the connecting element (27) that projects out of the housing.

7. In the support arm system in accordance with claim 6, wherein the cup-shaped housing element (24) has a plurality of bores (25), and the facing articulated element (22) of the articulated joint (20) has a plurality of threaded receptacles for a plurality of screws (26) inserted through the expanded through-bores (29) of the connecting element (27).

8. In the support arm system in accordance with claim 7, wherein the connecting element (27) has a plurality of threaded receptacles (30) for a plurality of screws (35) which connect the control device (10) with the connecting element (27).

9. In the support arm system in accordance with claim 8, wherein the articulated joint element (22) facing the control device (10) is designed and used as the cup-shaped housing element (24).

10. In the support arm system in accordance with claim 1, wherein one of the housing elements (24) is designed in a cup-shaped manner, and the other of the housing elements (33) is designed in a disk-shaped manner, and both of the housing elements (24, 33) are connected with each other with screws (35).

11. In the support arm system in accordance with claim 1, wherein the control device (10) is bolted to the connecting element (27) placed in the assembled housing through the centered opening (38) of the housing element (33) which is disk-shaped.

12. In the support arm system in accordance with claim 1, wherein the cup-shaped housing element (24) has a plurality of bores (25), and the articulated joint element (22) of the articulated joint (20) has a plurality of threaded receptacles for a plurality of screws (26) inserted through a plurality of through-bores (29) of the connecting element (27).

13. In the support arm system in accordance with claim 1, wherein the connecting element (27) has a plurality of threaded receptacles (30) for a plurality of screws (35) which connect the control device (10) with the connecting element (27).

14. In the support arm system in accordance with claim 1, wherein the articulated joint element (22) facing the control device (10) is designed and used as the cup-shaped housing element (24).

15. In a support arm system having a wall connector element, horizontal and vertical support arms, angle brackets, and joint elements, and a free end on which a control device is attached by an articulated joint, so that the free end is rotatably limited and can be fixed in place, the improvement comprising:

a housing having two housing elements (24, 33), the housing connected with an articulated joint element (22) of the articulated joint (20) facing the control device (10);

a connecting element (27) housed, elastically supported horizontally and vertically with a plurality of cushioning elements (31), in the housing; and the connecting element (27) connected with the control device (10), and the connecting element (27) partially projecting out of a centered opening (38) of a disk=shaped housing element (33) of the housing elements (24, 33), and a diameter of the centered opening (38) of the disk-shaped housing element (33) being larger than exterior dimensions of a part of the connecting element (27) that projects out of the housing.

* * * * *